(12) United States Patent
Wetters

(10) Patent No.: US 12,351,397 B2
(45) Date of Patent: Jul. 8, 2025

(54) OMNI-DIRECTION SPLIT ROLLER FOR A CONVEYOR

(71) Applicant: Dematic Corp., Grand Rapids, MI (US)

(72) Inventor: Paul L. Wetters, Rockford, MI (US)

(73) Assignee: Dematic Corp., Grand Rapids, MI (US)

( * ) Notice: Subject to any disclaimer, the term of this patent is extended or adjusted under 35 U.S.C. 154(b) by 142 days.

(21) Appl. No.: 18/302,613

(22) Filed: Apr. 18, 2023

(65) Prior Publication Data

US 2023/0331494 A1  Oct. 19, 2023

Related U.S. Application Data

(60) Provisional application No. 63/331,924, filed on Apr. 18, 2022.

(51) Int. Cl.
*B65G 39/12* (2006.01)
*B65G 13/10* (2006.01)
*B65G 39/04* (2006.01)

(52) U.S. Cl.
CPC ............ *B65G 39/12* (2013.01); *B65G 13/10* (2013.01); *B65G 39/04* (2013.01); *B65G 2207/34* (2013.01)

(58) Field of Classification Search
CPC ........ B65G 13/07; B65G 13/10; B65G 39/04; B65G 39/12; B65G 2207/34
See application file for complete search history.

(56) References Cited

U.S. PATENT DOCUMENTS

| 1,123,851 | A | * | 1/1915 | Cooper | B65G 39/09 |
| | | | | | 101/421 |
| 3,356,236 | A | * | 12/1967 | Shaw | B64F 1/32 |
| | | | | | 193/35 MD |

(Continued)

FOREIGN PATENT DOCUMENTS

WO    2012147169 A1    11/2012

OTHER PUBLICATIONS

Kornylak Corp. webpages taken from http://kornylak.com/wheels/transwheel-2000.html and having a copyright date of 1998-2008.

(Continued)

*Primary Examiner* — Gene O Crawford
*Assistant Examiner* — Keith R Campbell
(74) *Attorney, Agent, or Firm* — Gardner, Linn, Burkhart & Ondersma LLP

(57) ABSTRACT

A multi-directional or omni-roller for a conveyor system includes a first transport surface portion formed by a cylindrical roller body, and a second transport surface portion formed by multi-directional wheels. The wheels have a main body that is rotatable about a longitudinal axis of the roller, and a set of secondary wheels around an outer circumference of the main body. The secondary wheels rotate perpendicular relative to the rotation of the roller, and permit articles or drive belts to travel over the roller in a conveyance direction in a driven manner and permit articles to move laterally across the second transport surface portion without transferring lateral forces to a conveyor frame. For skew roller beds, a drive belt may drive the roller about the secondary wheels, substantially without lateral forces being transferred or introduced to the drive belt.

16 Claims, 17 Drawing Sheets

(56) References Cited

U.S. PATENT DOCUMENTS

| | | | | |
|---|---|---|---|---|
| 3,363,735 A | * | 1/1968 | Hotchkiss | B65G 13/10 |
| | | | | 193/37 |
| 3,552,541 A | * | 1/1971 | Riggs | B65G 13/10 |
| | | | | 198/525 |
| 3,804,230 A | * | 4/1974 | Krivec | B65G 13/10 |
| | | | | 198/791 |
| 3,878,927 A | * | 4/1975 | Murakami | B65G 13/10 |
| | | | | 193/37 |
| 3,923,150 A | * | 12/1975 | Jager | B65G 39/02 |
| | | | | 198/780 |
| 3,964,588 A | * | 6/1976 | Kornylak | B65G 47/766 |
| | | | | 198/786 |
| 4,019,627 A | * | 4/1977 | Eggert | B65G 47/54 |
| | | | | 198/786 |
| 5,404,984 A | * | 4/1995 | Hagman | B65G 39/02 |
| | | | | 193/35 MD |
| 2008/0000749 A1 | | 1/2008 | Li et al. | |
| 2012/0298481 A1 | | 11/2012 | Fourney | |
| 2018/0147442 A1 | | 5/2018 | Moon et al. | |

OTHER PUBLICATIONS

Kornylak Corp. brochure titled "Transwheel for Multi-Directional Movement", published more than one year prior to Apr. 18, 2022.
Rotacaster, 125mm Rotacasters Product Catalogue, copyright date 2015.
Rotacaster, R1-125mm Rotacaster Wheel brochure, published more than one year prior to Apr. 18, 2022.
Rotacaster, Conveyor & Materials Transfer Solutions brochure, published more than one year prior to Apr. 18, 2022.
Rotacaster, Rotacaster Wheels Hardness Scale, published more than one year prior to Apr. 18, 2022.
Rotacaster, Rotacaster Robot Wheels brochure, copyright date 2016.
International Search Report and Written Opinion from corresponding Patent Cooperation Treaty (PCT) Application No. PCT/IB2023/053977, completed Jun. 22, 2023.

* cited by examiner

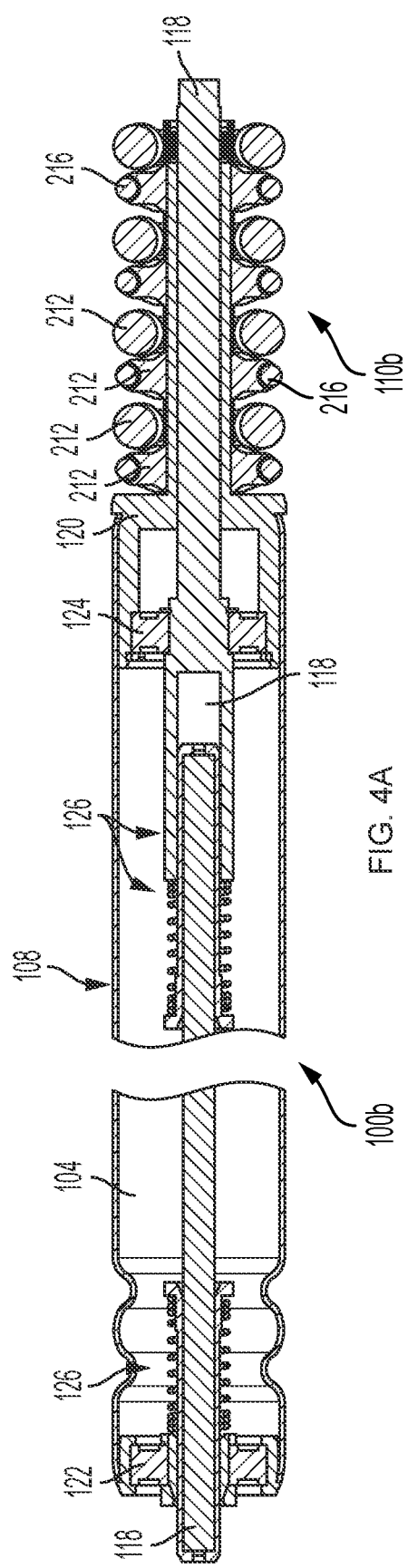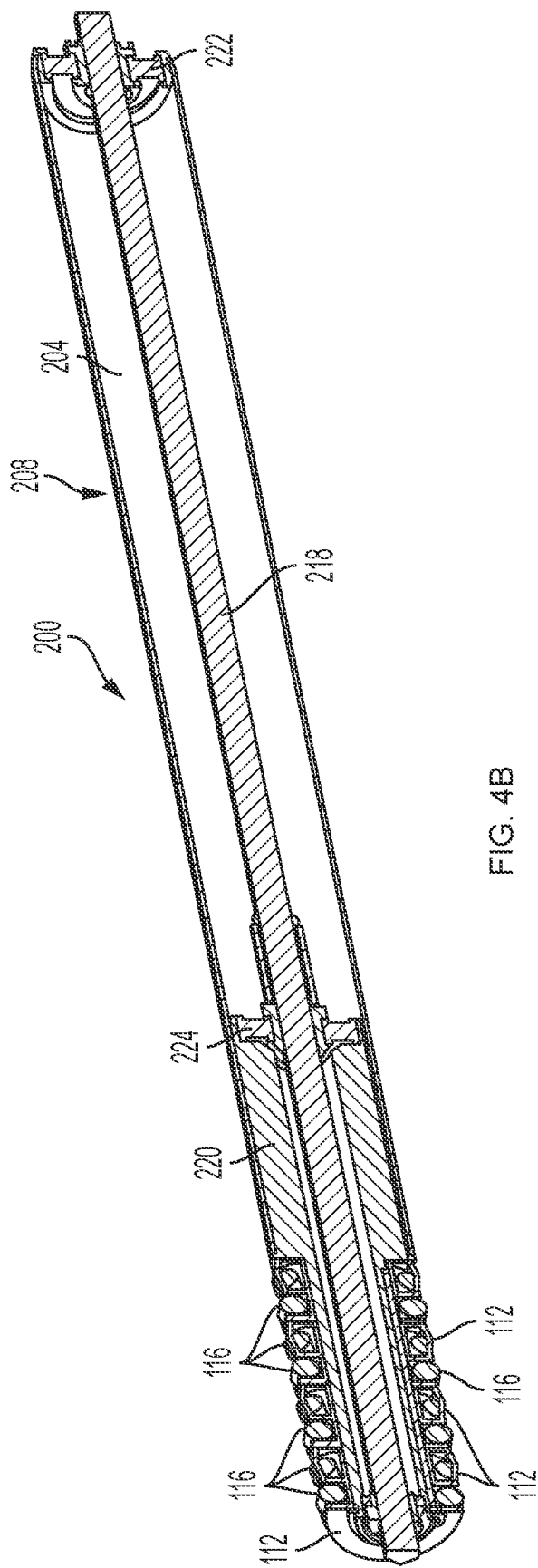

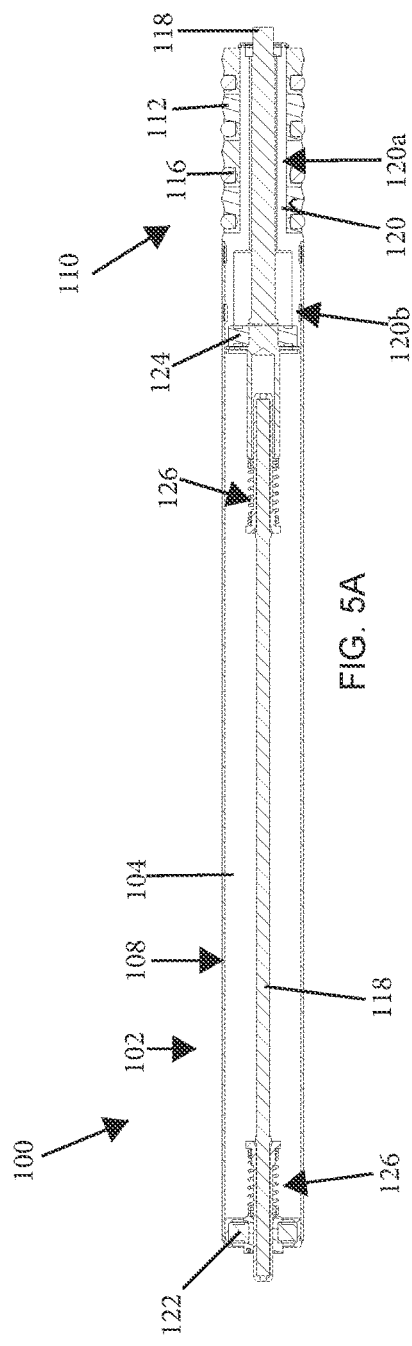
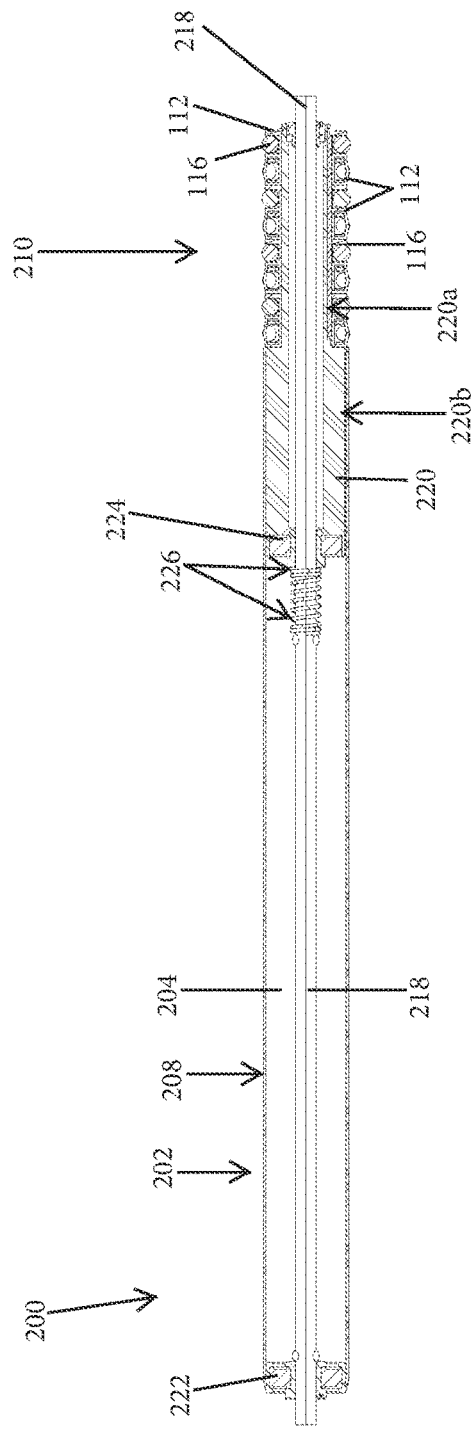
FIG. 5A
FIG. 5B

OMNI-DIRECTION SPLIT ROLLER FOR A CONVEYOR

CROSS REFERENCE TO RELATED APPLICATION

The present application claims priority of U.S. provisional application Ser. No. 63/331,924, filed on Apr. 18, 2022, which is hereby incorporated herein by reference in its entirety.

FIELD OF THE INVENTION

The present invention is directed to material handling conveyors, and in particular to roller conveyors.

BACKGROUND OF THE INVENTION

Roller conveyors are common in the material handling field. Roller conveyors are commonly known to be driven by drive belts that drive the rollers with frictional force. Drive belts are intended for transmitting loads via their skin along their longitudinal axes, and are susceptible to wear and damage when submitted to lateral loads. Lateral loads on drive belts are particularly problematic in skew roller conveyors in which the rollers are positioned at a slightly skewed angle relative to the intended conveyance direction of the conveyor. Lateral loads may also be introduced to conveyor rollers when they receive articles from an oblique supply conveyor or a right angle transfer. Such lateral loads may cause undo wear or damage to components of the conveyor, as well as the article itself.

SUMMARY OF THE INVENTION

The present invention provides a multiple directional or omni-roller for a conveyor system. The roller includes a multiple transport surface portions, one portion formed by a typical or commonly available cylindrical roller body, and a second portion formed by multiple directional wheels or omni-wheels. The omni-wheels have a main body that is rotatable about a longitudinal axis of the roller and a set of secondary wheels around an outer circumference of the main body. The secondary wheels rotate perpendicular to the longitudinal axis of the roller and permit articles or drive belts to travel over the roller in a conveyance direction in a driven manner and permit articles to move laterally across the second transport surface portion without transferring lateral forces to the conveyor frame. For skew roller beds, a drive belt may drive the roller about the secondary wheels, substantially without lateral forces being transferred or introduced to the drive belt.

According to one form of the present invention, a roller for a conveyor system includes a first portion having a cylindrical body with an exterior surface for supporting articles transported along the conveyor system in a transport direction, and that is rotatable about its longitudinal axis. A second portion includes a number of multi-directional wheels coupled with the first portion and that are rotatable about respective main axes. A plurality of secondary wheels are disposed about an outer circumference of the multi-directional wheels and are rotatable about respective secondary axes that are angled relative to the main axes. Optionally, the secondary axes are oriented perpendicular to the main axes.

In one aspect, the multi-directional wheels are disposed in linear arrangement alongside and parallel with the first portion such that the longitudinal axis of the first portion and the main axes of the multi-directional wheels are co-axial with one another.

In another aspect, the cylindrical body rotates synchronously with the multi-directional wheels.

In yet another aspect, an outer circumference of the cylindrical body and an outer circumference of the multi-directional wheels are substantially equal. Optionally, an article support surface of the multi-directional wheels is proud of an article support surface of the cylindrical body.

In still another aspect, the roller is oriented at an angle relative to the transport direction.

In a further aspect, a central shaft supports the roller at a frame of the conveyor system and also supports the cylindrical body and the multi-directional wheels.

In yet a further aspect, an adapter bearing is coupled to the central shaft and supports the multi-directional wheels. Optionally, the adapter bearing engages with an end of the cylindrical body. The adaptor bearing may also transfer rotational motion of the multi-directional wheels to the cylindrical body.

According to another form of the present invention, a roller conveyor for conveying articles in a transport direction includes a conveyor frame and a number of spaced-apart conveyor rollers coupled to the conveyor frame. The conveyor rollers include a first portion having a cylindrical body, in which the cylindrical body rotates about its longitudinal axis and has an exterior surface for supporting articles transported along the roller conveyor. A second portion is coupled to the first portion and includes a number of multi-directional wheels rotatable about a main axis, and a number of secondary wheels operably coupled at an outer circumference of the multi-directional wheels. The secondary wheels are rotatable about secondary axes that are perpendicular to the main axis. A drive belt engages the second portion to drive the conveyor rollers.

In one aspect, the conveyor rollers are oriented perpendicular to the transport direction.

In another aspect, the cylindrical body defines a first article support surface, and the multi-directional wheels define a second article support surface that is proud of the first article support surface. Optionally, the first article support surface is substantially coplanar with the second article support surface.

In yet another aspect, the roller conveyor is configured to receive articles from a right angle transfer of an adjacent conveyor system.

In still another aspect, the conveyor rollers are oriented at an angle relative to the drive belt.

The drive belt may frictionally engage the secondary wheels to rotate the secondary wheels, the multi-directional wheels, and the cylindrical body.

A method for driving rollers on a roller conveyor includes providing a conveyor with multi-directional rollers, such as described above, for example. The multi-directional rollers are provided for supporting and/or driving articles transported along the conveyor. Providing a drive belt to drive the multi-directional rollers, wherein the drive belt is positioned to impart a frictional drive force onto ones of a plurality of secondary wheels of a plurality of multi-directional wheels of the multi-directional roller. The method includes driving the multi-directional rollers with the drive belt substantially in a conveyance direction of the conveyor. An article is transported on one or both of a first transport surface portion and a second transport surface portion of the multi-directional rollers. The multi-directional rollers may be oriented at an angle relative to the conveyance direction of the conveyor and the drive belt.

Accordingly, the present invention provides an omni-directional roller having two or more transport surface portions. At least one of the transport surface portions is configured to transmit forces in a vertical direction and a direction substantially perpendicular to the longitudinal axis of the roller without transmitting any forces lateral or parallel to the longitudinal axis of the roller. The other transport surface portions may transmit forces lateral or parallel to the longitudinal axis of the roller. In one embodiment, a skewed or oblique roller bed may be driven by a drive belt that operates parallel to the conveyance direction of the conveyor without receiving substantial lateral forces, which may otherwise reduce the working life of the drive belt.

These and other objects, advantages, purposes, and features of this invention will become apparent upon review of the following specification in conjunction with the drawings.

BRIEF DESCRIPTION OF THE DRAWINGS

FIG. 4A is a sectional elevation view of an omni-directional grooved roller depicted with an indeterminate length for a conveyor in accordance with the present invention, where the grooved roller includes an alternative second portion having alternative multi-directional wheels;

FIG. 4B is a sectional view of an alternative omni-directional roller having a single axle in accordance with the present invention;

FIG. 5A is a sectional elevation view of the roller of FIG. 1;

FIG. 5B is a sectional elevation view of the roller of FIG. 4B;

DESCRIPTION OF THE PREFERRED EMBODIMENTS

Figure 1:
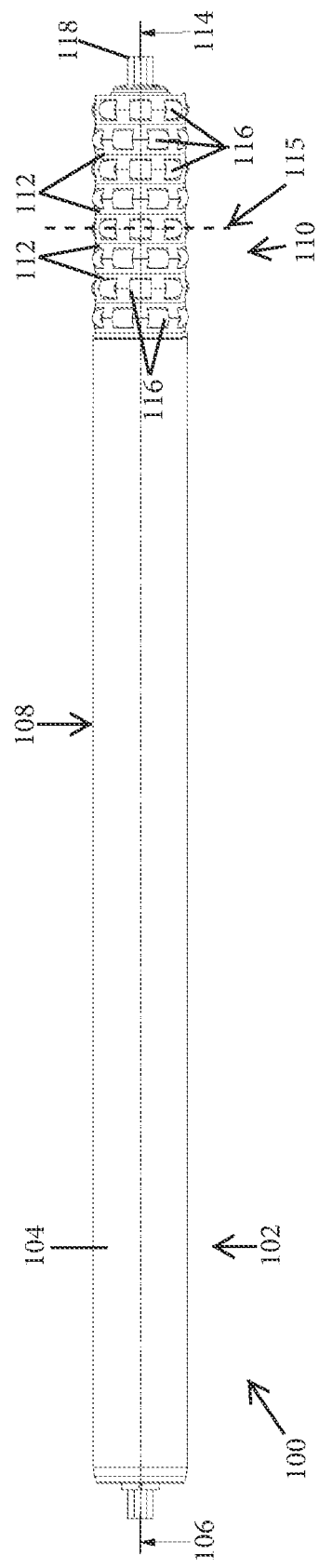
FIG. 1 is a side elevation view of an omni-directional roller for a conveyor in accordance with the present invention, where the roller includes a second portion having partially encased multi-directional wheels.

Referring now to the drawings and the illustrative embodiments depicted therein, a multi-directional or omni-directional split roller is provided for a roller conveyor system. The omni-directional roller enables articles to move substantially freely in a lateral direction along a portion the roller and/or enables a drive belt to drive the roller along substantially free of any lateral forces on the drive belt. The roller utilizes a standard or typical cylindrical roller body to provide one portion of the transport surface of the roller and one or more multiple directional wheels to provide the remainder of the transport surface of the roller. The multiple direction wheels are rotatable about the same longitudinal axis of the cylindrical roller body portion, while secondary wheels along the outer circumference of the multiple direction wheels are rotatable about a secondary axis that is oriented perpendicular or at an angle to the longitudinal axis of the roller. The roller may be utilized in various roller conveyor configurations, such as in perpendicular roller conveyors in order to receive articles from an adjacent right angle transfer or for skew or oblique angled roller conveyors in which the rollers are oblique, i.e. not perpendicular, to the conveyance direction of the conveyor. The roller is particularly well suited for use in skew roller conveyors that are driven by a drive belt, wherein the drive belt frictionally engages the secondary wheels of the multiple direction wheels to drive or rotate the entirety of the roller about its longitudinal axis. In this manner, the drive belt is subject to minimal or substantially no lateral forces, which may extend the useful life of the drive belt.

Referring to the illustrative embodiments of FIGS. 1-3, and 5A, a multi-directional or omni-directional split roller 100 is provided for a conveyor system, such as conveyor systems 300 or 500 depicted in the illustrative embodiments of FIGS. 14, 16, and 17, and described in further detail below. The roller 100 includes a first transport surface portion or section 102 having a unitary cylindrical body 104 configured to rotate about its longitudinal axis 106. An exterior surface 108 at the outer circumference of the body 104 defines the transport surface that supports articles being transported along the conveyor system. A second transport surface portion or section 110 is provided adjacent or alongside the first transport surface portion 102. The second transport surface portion 110 includes a plurality of multi-directional wheels or omni-wheels 112, each having a main axis 114 about which the wheel 112 rotates. In the illustrated embodiment, pairs of wheels 112 are conjoined or otherwise formed or manufactured as a unitary body, but could alternatively be fastened, adhered, or otherwise coupled to one another. In many aspects, wheels 112 may be similar or substantially identical in structure and function to multi-directional wheels produced and marketed under the brand name KORNYLAK CORPORATION, by Kornylak Corporation of Hamilton, Ohio. As discussed below, a second transport surface portion may alternatively include multi-directional wheels that are not coupled together in pairs such that each wheel is independently rotatable relative to one another. Alternatively, all of the multi-directional wheels could be coupled or connected to one another via a unitary frame or body that rotates about the main axis.

Each omni-wheel 112 includes multiple secondary wheels 116 circumferentially spaced about an outer circumference of the wheel 112. In the illustrated embodiment of FIGS. 1-3 and 5A, each wheel 112 includes eight spaced-apart secondary wheels 116 that are offset from eight spaced-apart secondary wheels on an adjacent roller. The center or middle of a secondary wheel 116 on an omni-wheel 112 is centrally located or located halfway between a pair of secondary wheels 116 on an adjacent omni-wheel 112. Accordingly, the offset between secondary wheels 116 from one wheel 112 to an adjacent wheel 112 is such that the collective or conjoined outer surface or circumference of each pair of conjoined or coupled wheels 112 will include at least one secondary wheel 116 in the longitudinal direction or the direction of the main axis. As a result, loads applied at angles to the conveyance or transport direction at the second transport surface or section 110, such as from a drive belt oriented at a skewed or non-perpendicular angle relative to roller 100, will always be at least partially transferable to a secondary wheel 116. Secondary wheels 116 are rotatable about respective secondary axes 115 (FIG. 1) that are perpendicular to the main axis 114 of wheels 112. In particular, secondary wheels 116 are rotatable about axles that are coupled proximate the outer circumference of wheels 112 and aligned at an angle to the main axis. It should be appreciated, however, that secondary axes may be oriented at other angles relative to a main axis or main axes.

Figure 11:
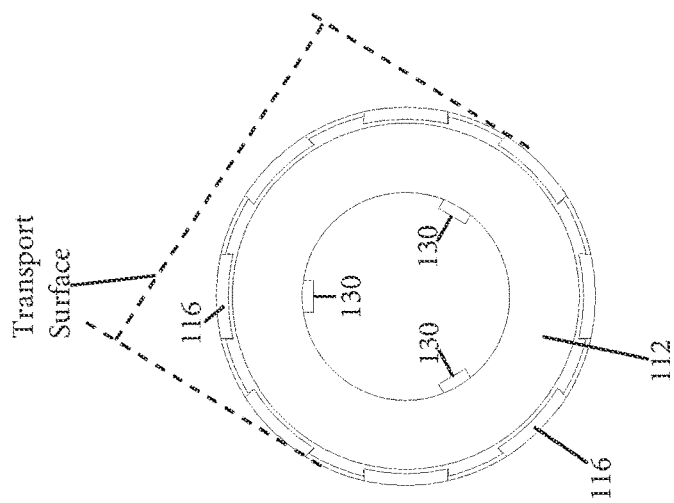
FIG. 11 is a side elevation view of the multiple directional wheel of FIG. 9.

The omni-wheels 112 are arranged in a linear manner alongside and parallel to the cylindrical body 104 of the first transport surface portion 102 such that the longitudinal axis 106 of the first portion 102 and the main axes 114 of the omni-wheels 112 are co-axial with each other. The outer circumference of the cylindrical body 104 (i.e. the transport surface of the cylindrical body and the first portion 102) and an extreme or outermost boundary or circumference of each omni-wheel 112 (as defined by the outermost surfaces of the secondary wheels 116, see FIGS. 10 and 11, i.e. the transport surface of the omni-wheels 112 and the second portion 110) may be substantially equal with each other, such that the roller 100 defines a uniform transport surface along the first and second transport surface portions 102 and 110. In a preferred embodiment, the outer circumference/transport surface of the omni-wheels 112 is slightly larger than the outer circumference/transport surface of the cylindrical body 104. As such, the omni-wheels 112 are proud of the cylindrical body 104 to some extent, thereby reducing or minimizing drag or friction forces on an article as it transfers onto the transport surface of the cylindrical body 104 from the transport surface of the omni-wheels 112.

Figure 2:
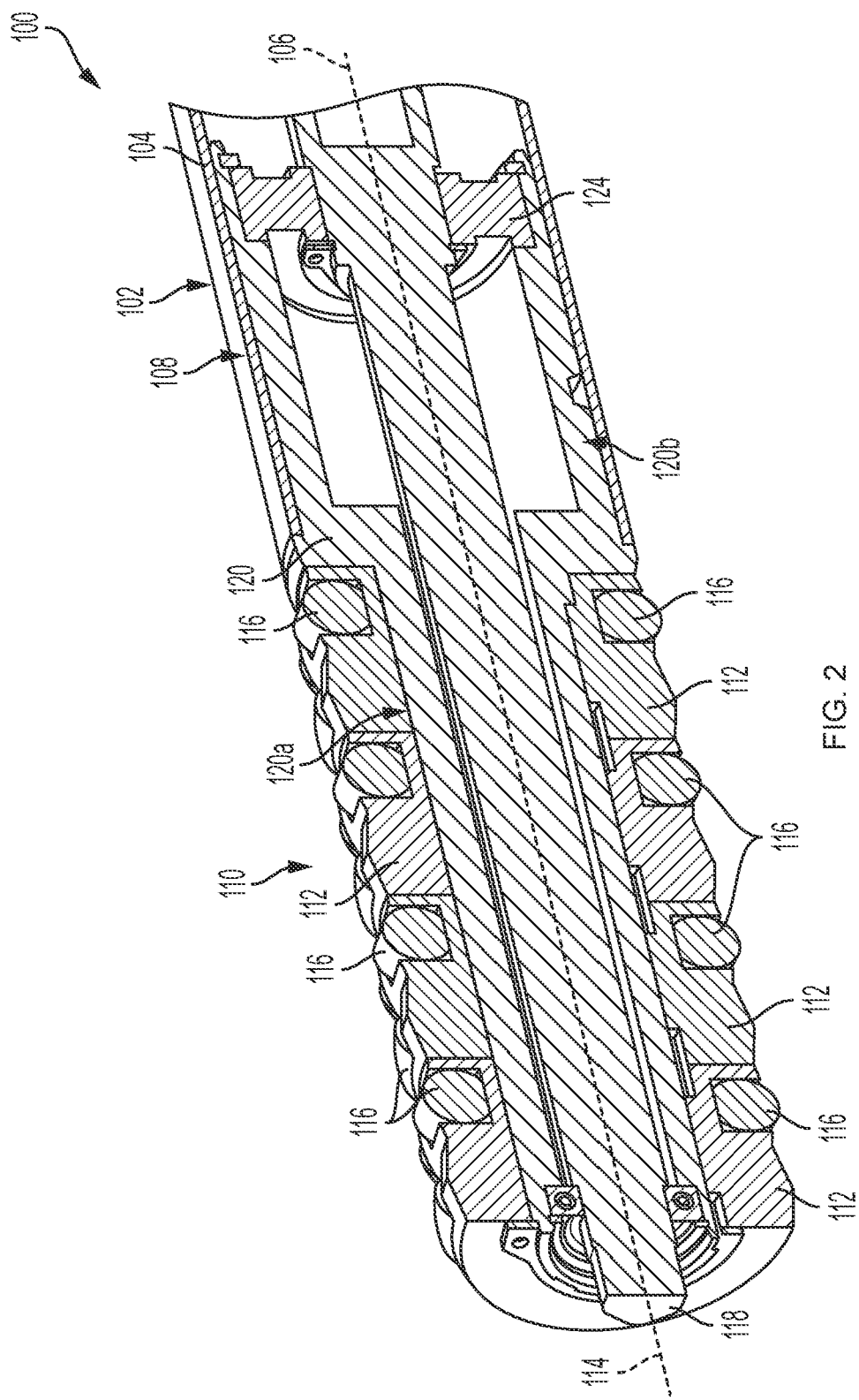
FIG. 2 is a sectional perspective view of the second portion of the roller of FIG. 1.
Figure 3:
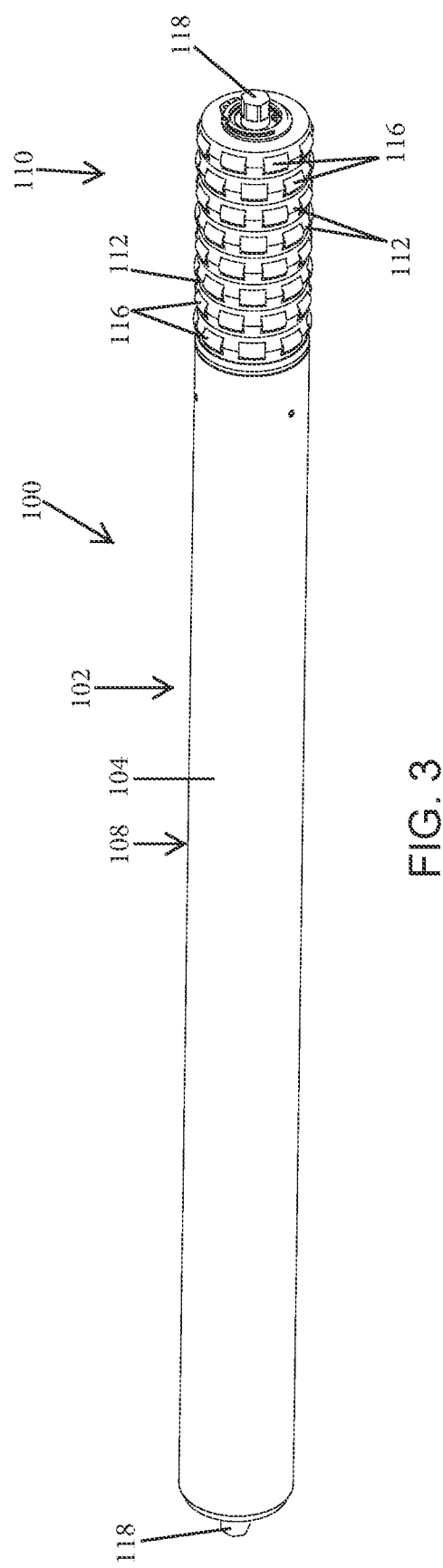
FIG. 3 is a side perspective view of the roller of FIG. 1.
Figure 4C:
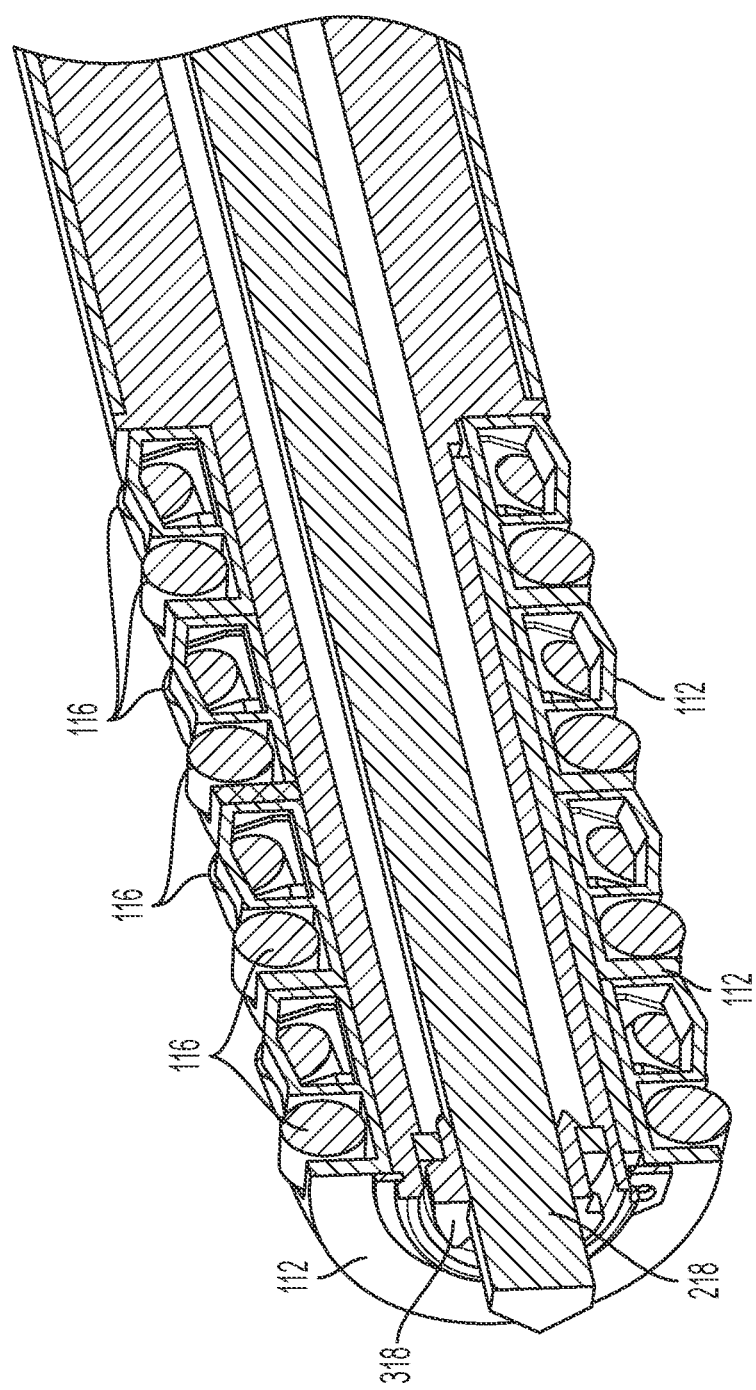
FIG. 4C is a sectional perspective view of a second portion of the roller of FIG. 4B.
Figure 4D:
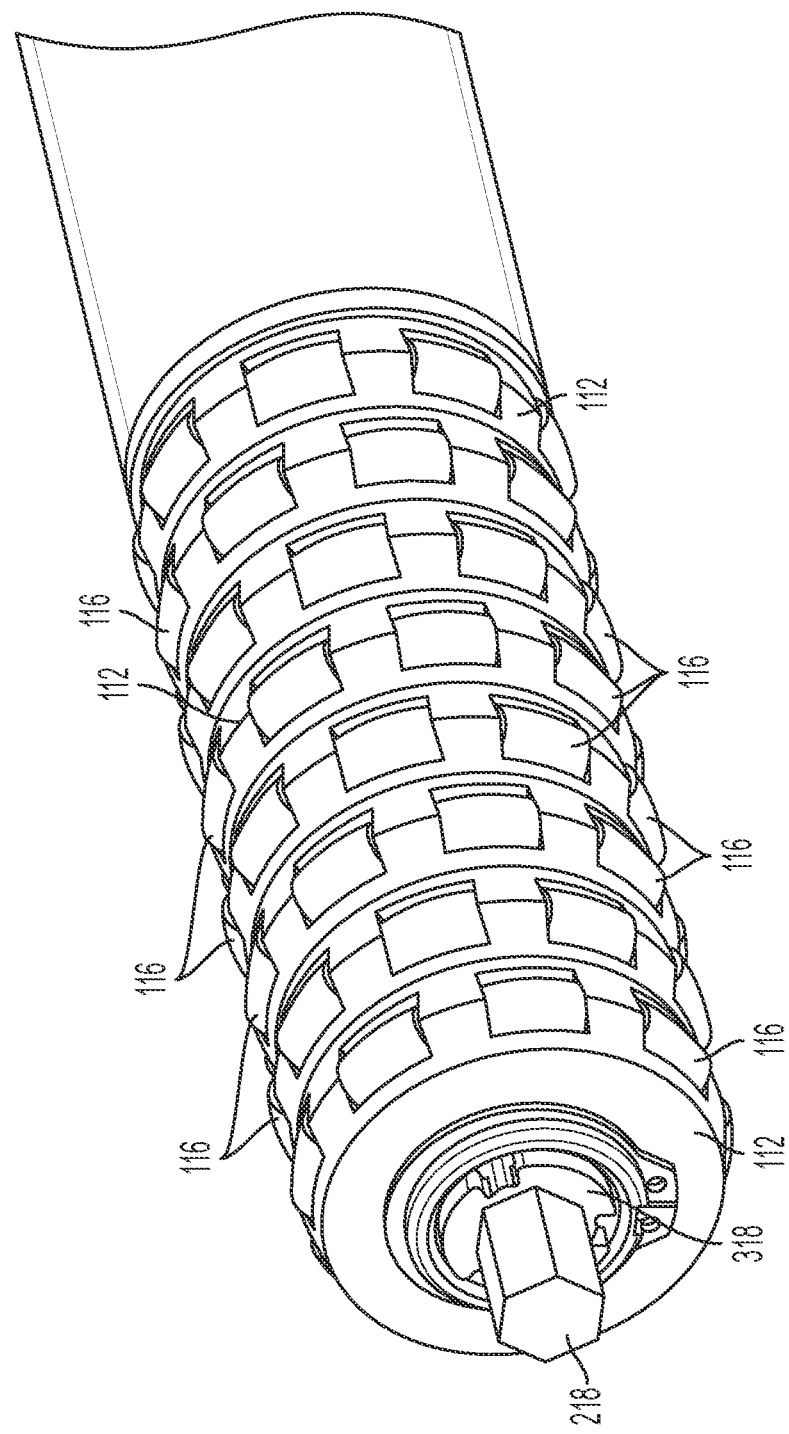
FIG. 4D is a perspective view of the second portion of the roller of FIG. 4B.
Figure 4E:
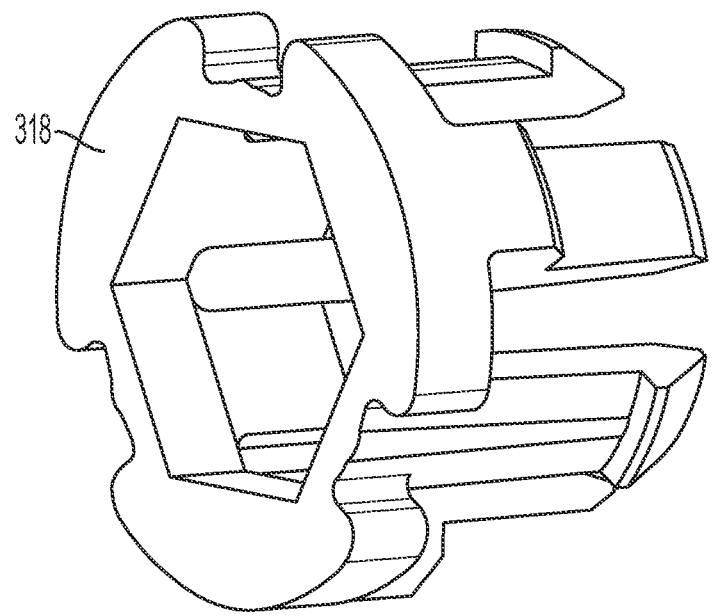
FIG. 4E is a perspective view of a retaining ring of the roller of FIG. 4B.
Figure 6:
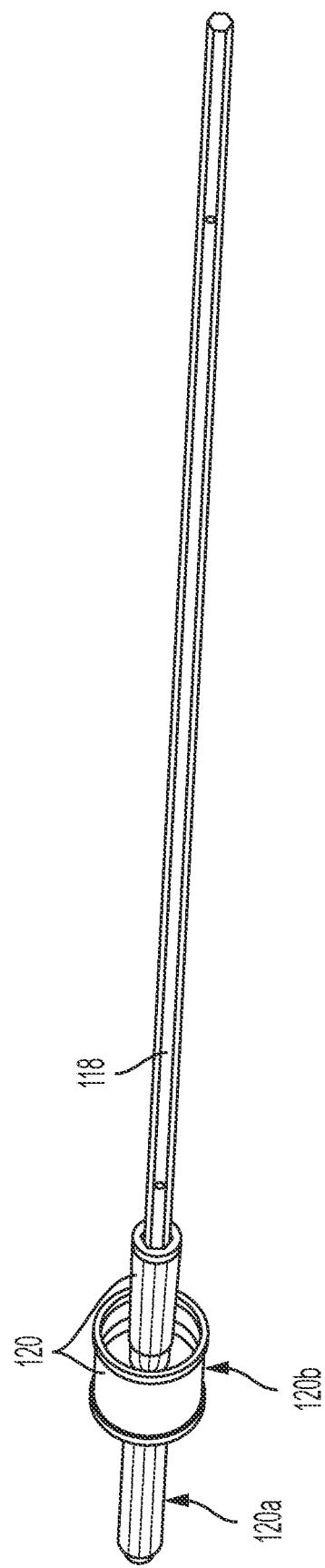
FIG. 6 is a side perspective view of a central shaft of the roller of FIG. 1.
Figure 7:
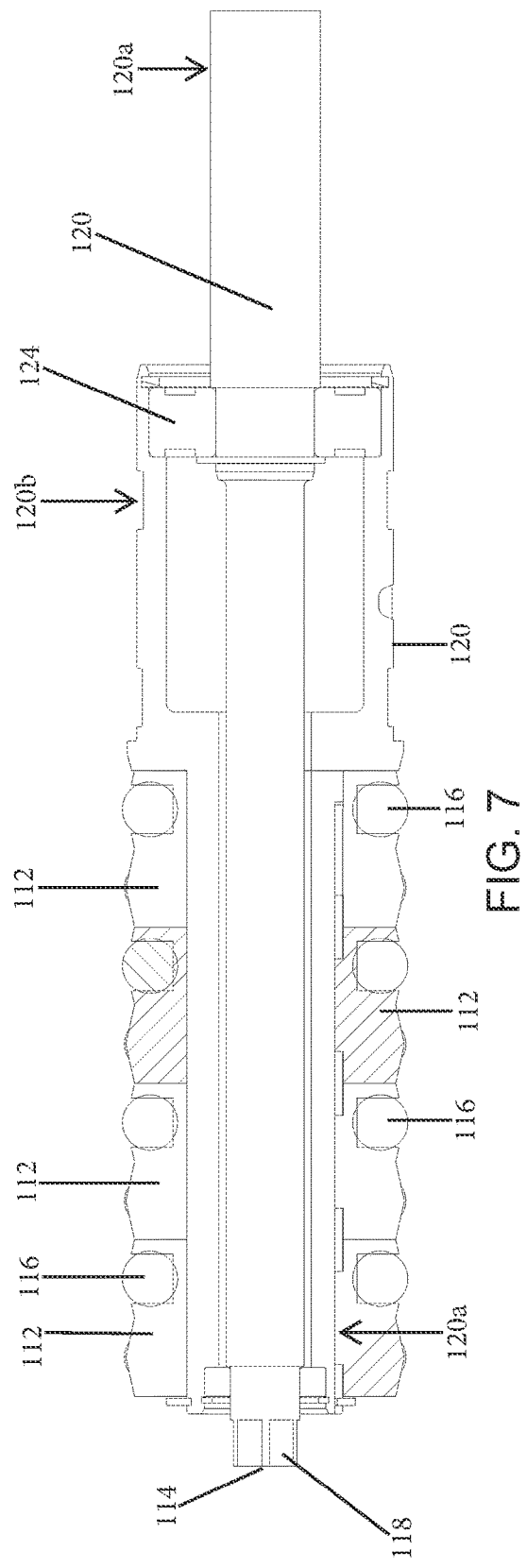
FIG. 7 is a side elevation view of an adapter bearing and a multiple directional portion of the roller of FIG. 1.
Figure 8:
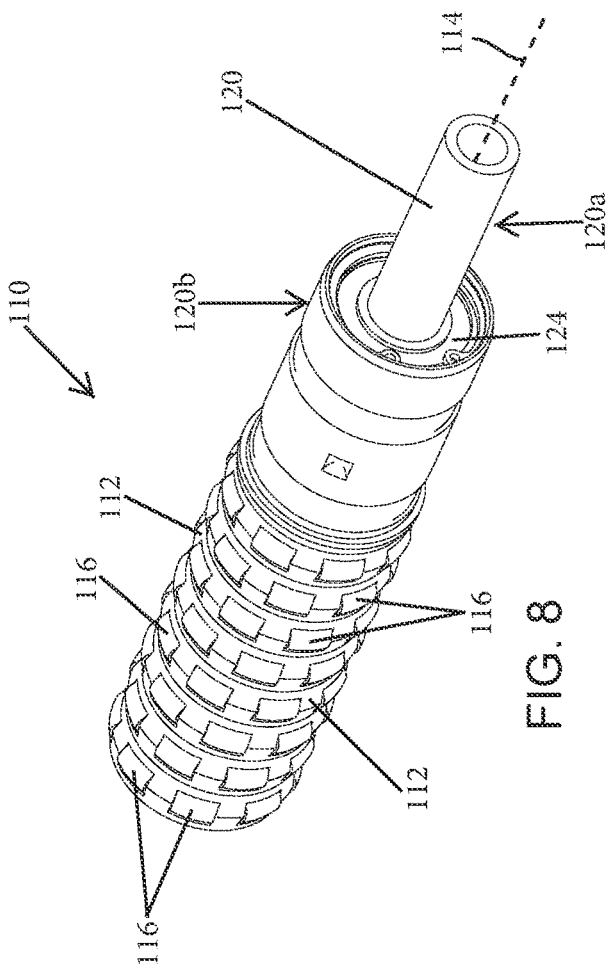
FIG. 8 is a side perspective view of the adapter bearing and multiple directional portion of FIG. 7.
Figure 10:
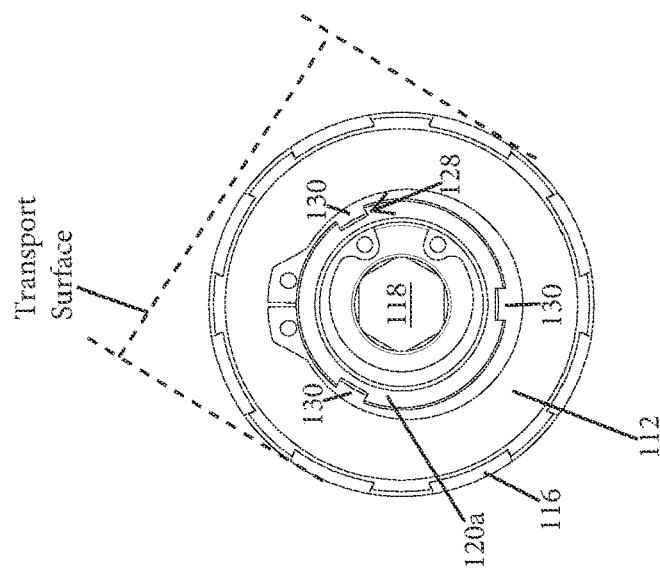
FIG. 10 is a side elevation view of the adapter bearing and multiple directional portion of FIG. 7.

A central shaft 118 supports the roller 100 at a frame of the conveyor system and provides a support or mount for the cylindrical body 104 of the first portion 102 and the omni-wheels 112 of the second portion 110 (FIGS. 2 and 6). With further reference to FIGS. 7, 8, and 10, an adaptor bearing, sleeve, or plug 120 is provided at the end of the central shaft and includes a small diameter portion 120a for supporting the omni-wheels 112. The adapter plug 120 supports each of the omni-wheels 112. The adapter plug 120 includes a larger diameter portion 120b that is receivable inside a distal end of the cylindrical body 104 to engage and support the distal end of the body 104 and to ensure that the first and second transport surface portions 102 and 110 remain co-axial with one another. The roller 100 includes a support bearing 122 between the proximal end of the cylindrical body 104 and the central shaft 118 and a support bearing 124 between the distal end of the cylindrical body 104 and a proximal end of the adapter sleeve 120. Optionally, as shown in the illustrative embodiment of FIG. 4A which is discussed in further detail below, the central shaft 118 may include spring-loaded mechanisms 126 at one or both ends of the shaft 118, permitting the roller 100 to be readily installed and removed at a position within the conveyor frame.

Figure 9:
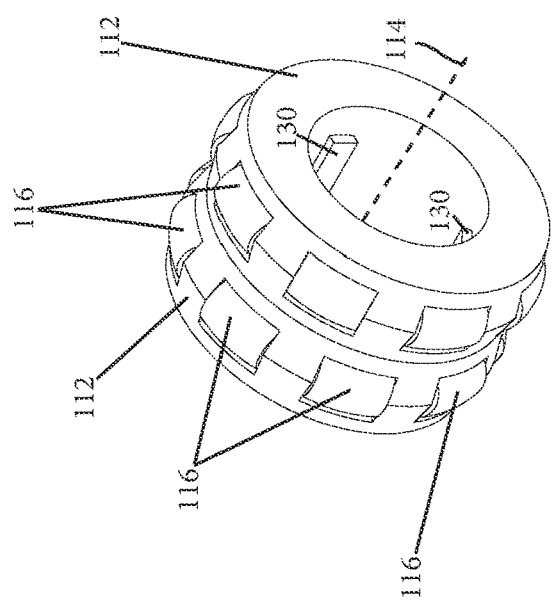
FIG. 9 is a side perspective view of a multiple directional wheel of the multiple directional portion of the roller of FIG. 1.
Figure 12A:
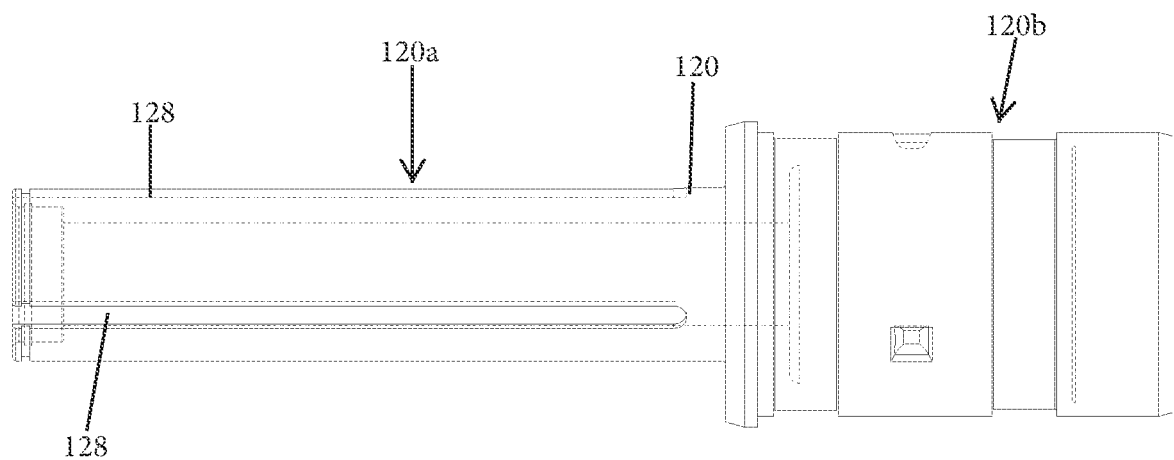
FIG. 12A is a side elevation view of the adapter bearing of FIG. 7.
Figure 12B:
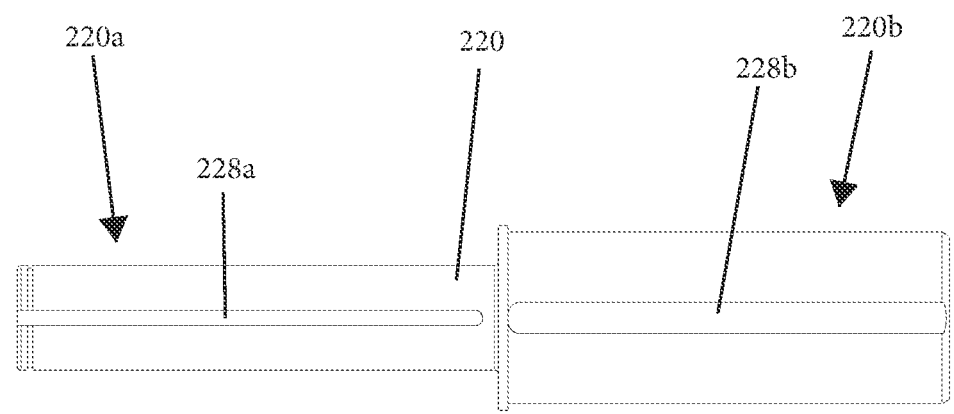
FIG. 12B is a side elevation view of an alternative adaptor bearing, in accordance with the present invention.

It is contemplated that in some embodiments the omni-wheels 112 may be either (i) fixed in relation to the central shaft 118 and adapter sleeve 120 such that the wheels 112 rotate in sync with the cylindrical body 104, or (ii) freely rotatable relative to the central shaft 118 and adapter sleeve 120 permitting the main wheel portions to rotate independently of one another and the cylindrical body 104 about their main axes 114. In the illustrative embodiment of FIGS. 9-12A and 13A, the adapter sleeve 120 includes three keyways 128 formed longitudinally along the exterior surface of the smaller diameter portion 120a of the adapter sleeve 120. Each omni-wheel 112 includes three keys 130 (FIGS. 9-11) formed on an interior diameter of the wheel 112 and the keys 130 are positioned and dimensioned to mate with the keyways 128 when installed on the adapter sleeve 120. The keyways 128 and keys 130 cooperate to retain the wheels 112 relative to the adapter sleeve 120 and thereby the central shaft 118.

Figure 13A:
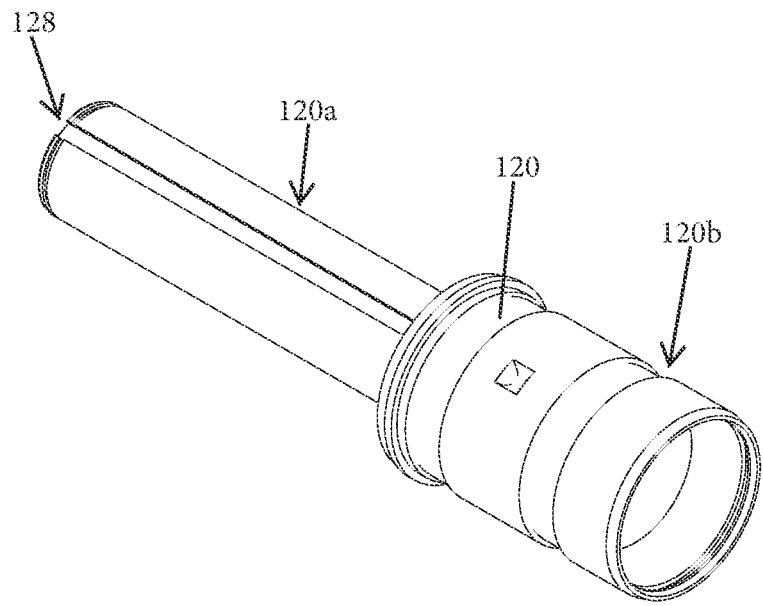
FIG. 13A is a side perspective view of the adapter bearing of FIG. 12A.
Figure 13B:
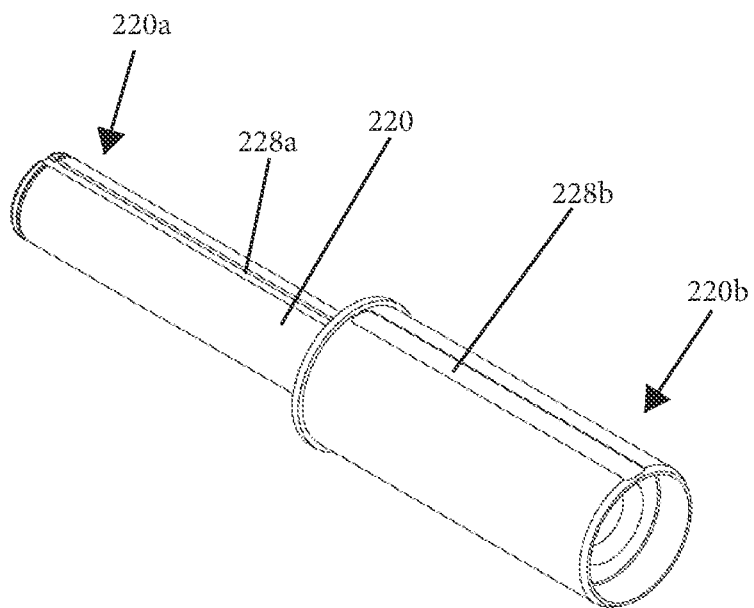
FIG. 13B is a side perspective view of the adaptor bearing of FIG. 12B.

It should be appreciated that an adaptor bearing or sleeve may vary in various respects from adaptor sleeve 120 discussed above. For example, with reference to FIGS. 12B and 13B, an alternative adaptor sleeve 220 includes only a single keyway 228a on a small diameter portion 220a that couples adaptor sleeve 220 to multi-directional wheels, and a single keyway 228b on a large diameter portion 220b that couples adaptor sleeve 220 to a cylindrical body of a roller. Accordingly, a multi-directional wheel having only a single key may be coupled to adaptor sleeve 220.

Referring to the illustrative embodiment of FIGS. 14, 15, and 17, a roller conveyor 500 includes a conveyor frame 502 configured to support an array of omni-directional split rollers, such as grooved rollers 100b described below and illustrated in FIG. 4A. As shown in FIG. 14, the rollers 100b are oriented at an oblique angle relative to the transport direction of the roller conveyor 500. In some embodiments, the rollers 100b of conveyor 500 may be driven by a drive belt system 501, such as commonly known and commercially available, for driving conveyor rollers 100 (FIG. 17). The drive belt system 501 includes a drive belt 504 that frictionally engages an underneath surface of the conveyor rollers (i.e. on the opposite side of the conveyance surface). The drive belt 504 is positioned to frictionally engage a second transport surface portion 110b at secondary wheels 216 of an omni-wheels 212 (FIGS. 15 and 16). In this manner, although the rollers 100b are skewed or obliquely oriented, including with respect to drive belt 504, the drive belt 504 may experience minimal to no lateral forces while driving the rollers 100b. This is due in part to the frictional drive force between the belt 504 and rollers 100b being mainly transferable in the conveyance direction and only minimally transferable in the lateral direction due to the orientation of the freely rotatable secondary wheels 216. While the drive belt 504 is described herein as driving the roller 100b about the secondary wheels 216 of the omni-wheels 212, it will be appreciated that the drive belt of the conveyor may drive the roller 100b about the cylindrical body 104 of the roller 100b, either in addition to the drive belt 504 driving the secondary wheels 116 or an alternative thereof.

Figure 14:
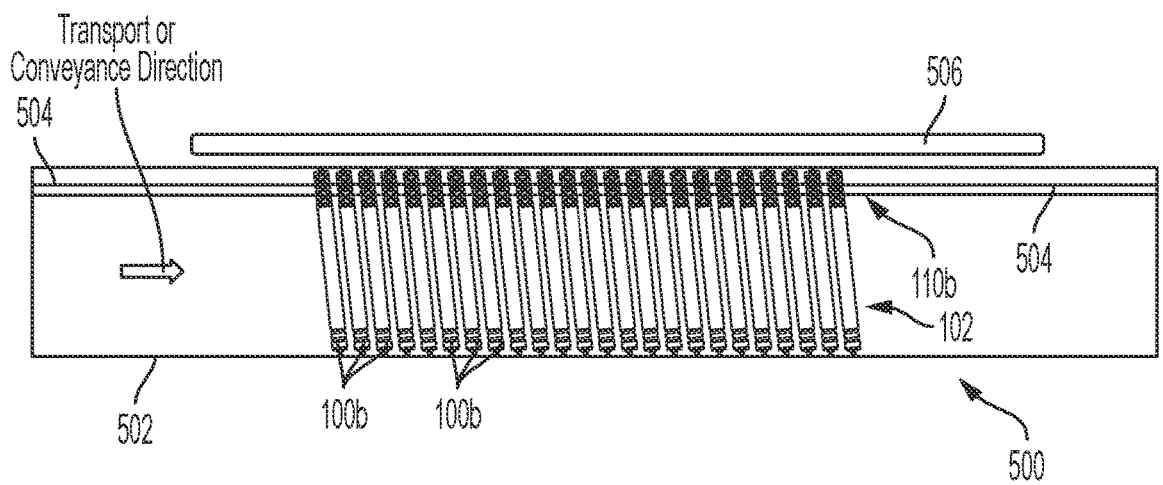
FIG. 14 is a plan view of a portion of a skew roller conveyor with a plurality of the rollers of FIG. 4A, in accordance with the present invention.
Figure 15:
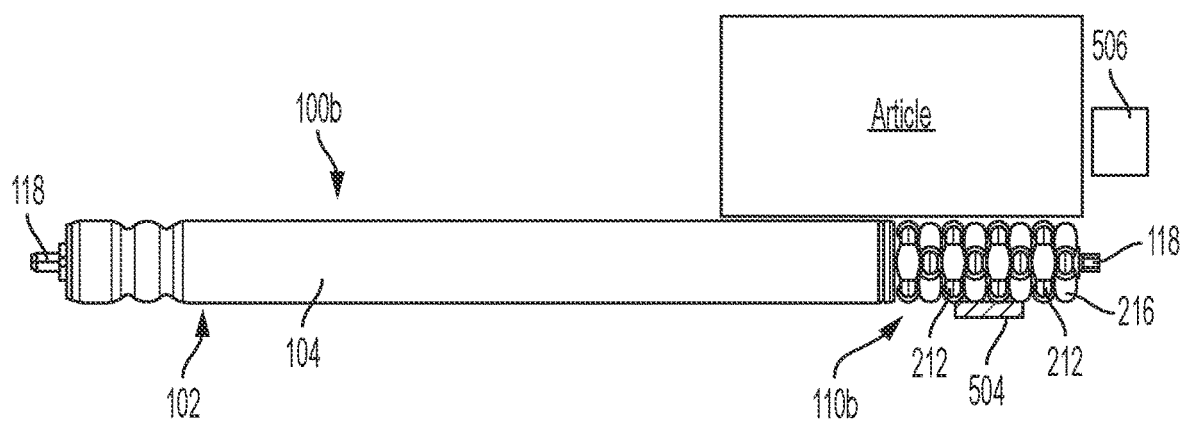
FIG. 15 is an elevation view of the conveyor of FIG. 14.

Referring still to FIGS. 14 and 15, the conveyor 500 includes a guide rail 506 for retaining articles on the conveyor 500. The skew of the rollers 100b causes frictional forces between the cylindrical body 104, the secondary wheels 216, and an article supported thereon, to drive the articles toward the guide rail 506. The guide rail 506 and skewed rollers 100b cooperate to adjust or justify the orientation of articles traveling along the conveyor 500 (e.g. rectangular packages are rotated to a substantially right or 90° orientation relative to the conveyance direction). When articles impact or meet the guide rail 506 they may experience frictional forces with the guide rail 506, which may be transferred through the article onto the transport surface of the conveyor 500. The orientation of the freely rotatable secondary wheels 216 in the second transport surface portion 110b enables frictional forces experienced at the guide rail, which may otherwise be transferred via the rollers 100b into the conveyor frame 502, to be dissipated or all together eliminated.

Figure 16:
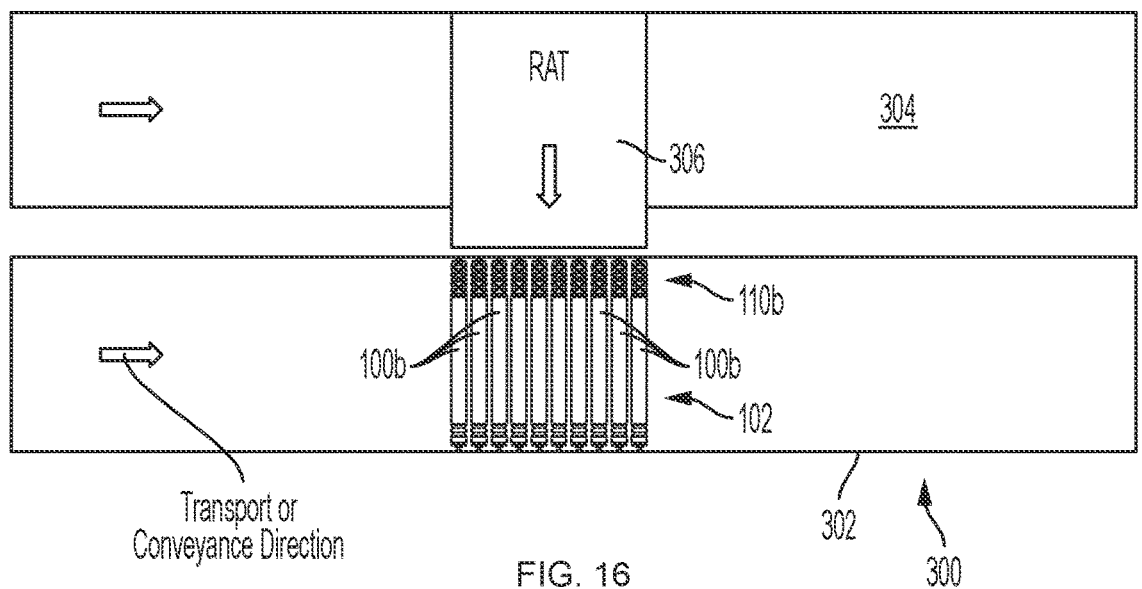
FIG. 16 is a plan view of a portion of another roller conveyor with a plurality of the rollers of FIG. 1 and a right angle transfer of an adjacent conveyor, in accordance with the present invention.
Figure 17:
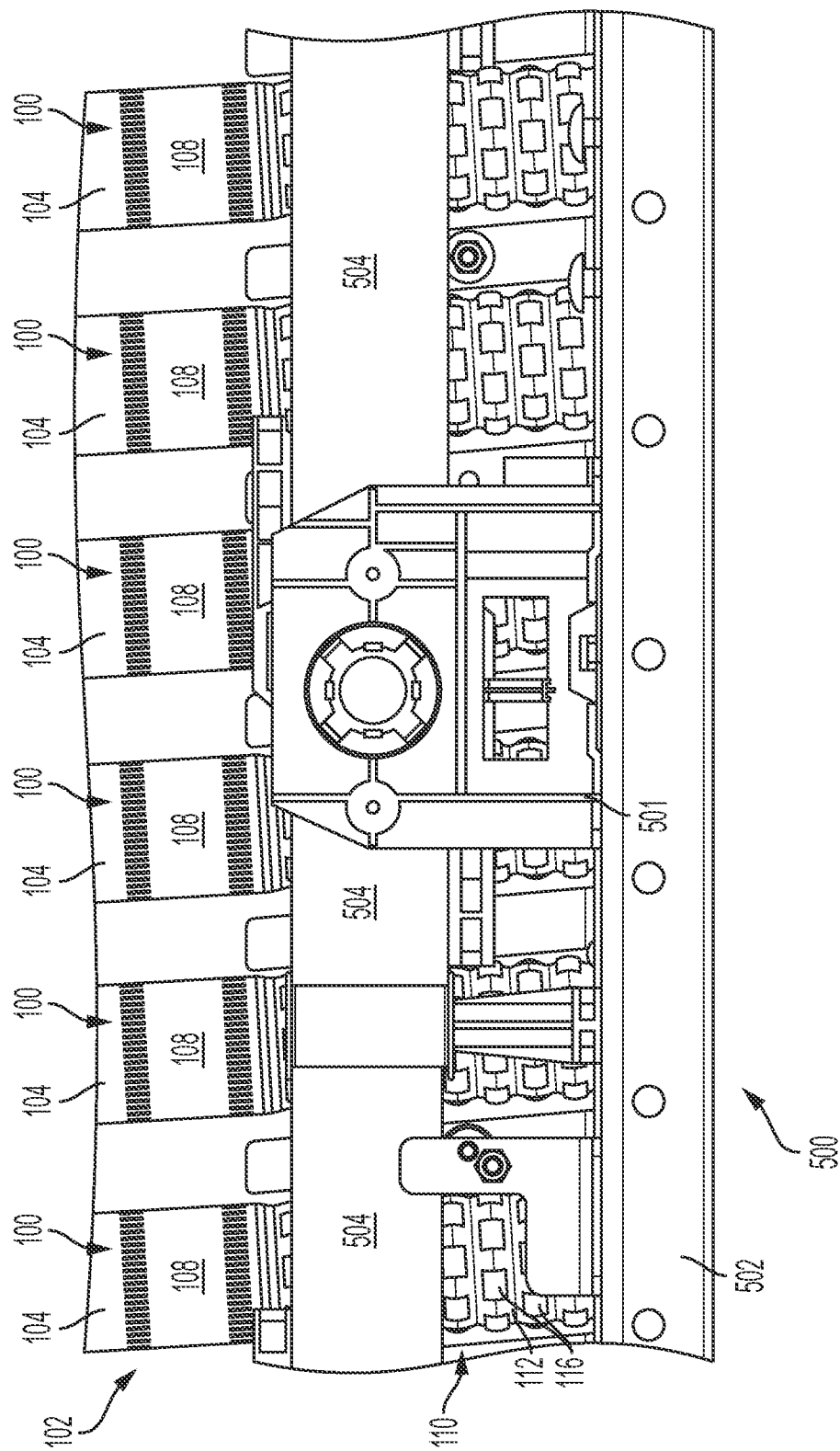
FIG. 17 is a bottom view of a drive system for a roller conveyor with a plurality of the rollers of FIG. 1.

Referring to the illustrative embodiment of FIG. 16, another roller conveyor 300 includes a conveyor frame 302 configured to support an array of omni-directional split rollers, such as rollers 100b described above and illustrated in FIG. 4A. The rollers 100b are oriented perpendicular to the transport direction of the roller conveyor 300. An adjacent conveyor 304 includes a right angle transfer (RAT) 306, which is operable to transfer articles laterally onto the transport surface of conveyor 300. As articles transfer from the RAT 306 onto the transport surface of conveyor 300 the article imparts a lateral force on the transport surfaces 102 and 110b of the rollers 100b which may transfer into the central shaft 118 and ultimately to the conveyor frame 302. Due to the orientation of the freely rotatable secondary wheels 216, the lateral force transfer of a transferred article is minimized at the second transport surface portion 110b of the rollers 100b, which may facilitate smoother transfers resulting in reduction or elimination of damage to the articles, the rollers 100b, and or the conveyor frame 302, and may additionally reduce or eliminate jamming of articles at the transition between conveyors 300 and 304. A drive belt system, such as similar to drive belt system 501 described about and illustrated in FIGS. 14-15 and 17, may be provided to drive the rollers 100b of conveyor 300. Such a drive belt system may drive the rollers 100b about the secondary wheels 216 of the omni-wheels 212. It will be appreciated that the drive belt of the conveyor may drive the roller 100b about the cylindrical body 104 of the roller 100b, either in addition to the drive belt driving the secondary wheels 216 or as an alternative thereof.

Figure 19:
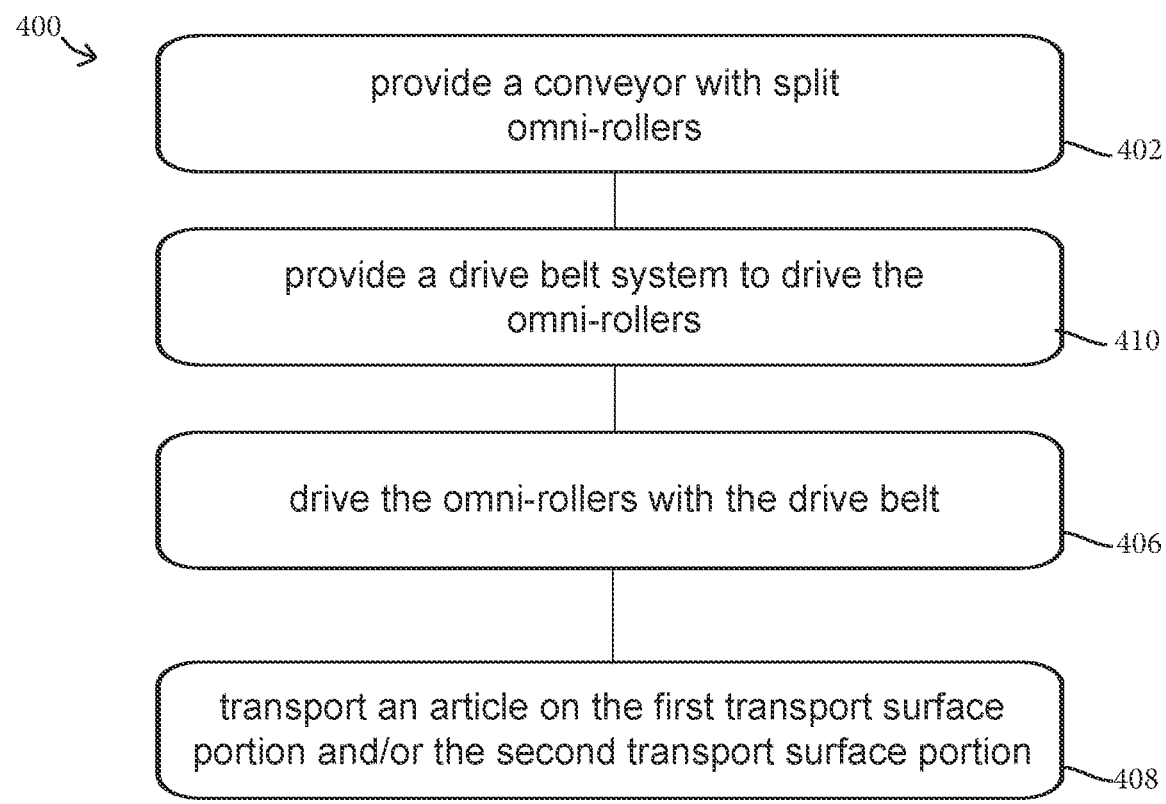
FIG. 19 is a diagram of a method for driving multiple directional rollers of a conveyor system.

Referring to the diagram of FIG. 19, a method 400 is provided for driving rollers on a roller conveyor and includes providing 402 a plurality of multiple directional rollers, such as multiple directional rollers 100 described above and illustrated in FIG. 1, for supporting articles transported along the conveyor. The conveyor may be similar or substantially identical in structure and function as either of conveyors 300 or 500 described above and illustrated in FIGS. 14-17. The method 400 includes providing 404 a drive belt system having a drive belt to drive the multiple directional rollers 100. The drive belt is positioned to impart a frictional drive force to the secondary wheels 116 of the multiple directional wheels 112 of the roller 100. The method 400 includes driving 406 the drive belt to drive the multiple directional rollers 100 substantially in a conveyance direction of the conveyor. The method 400 includes transporting 408 an article one or both of the first transport surface portion 102 and the second transport surface portion 110 of the rollers 100. Optionally, the multiple direction rollers 100 may be oriented at an oblique angle or other angle relative to the conveyance direction of the conveyor, such as shown in the illustrative embodiments of FIG. 14. As such, the drive belt of the drive belt system is oblique to the longitudinal axis of the rollers 100. Preferably, the drive belt is positioned to drive the rollers 100 about the secondary wheels 116 at the second transport surface portion 110 such that lateral forces may be minimized or substantially eliminated from transferring between the rollers 100 and the drive belt.

Figure 18:
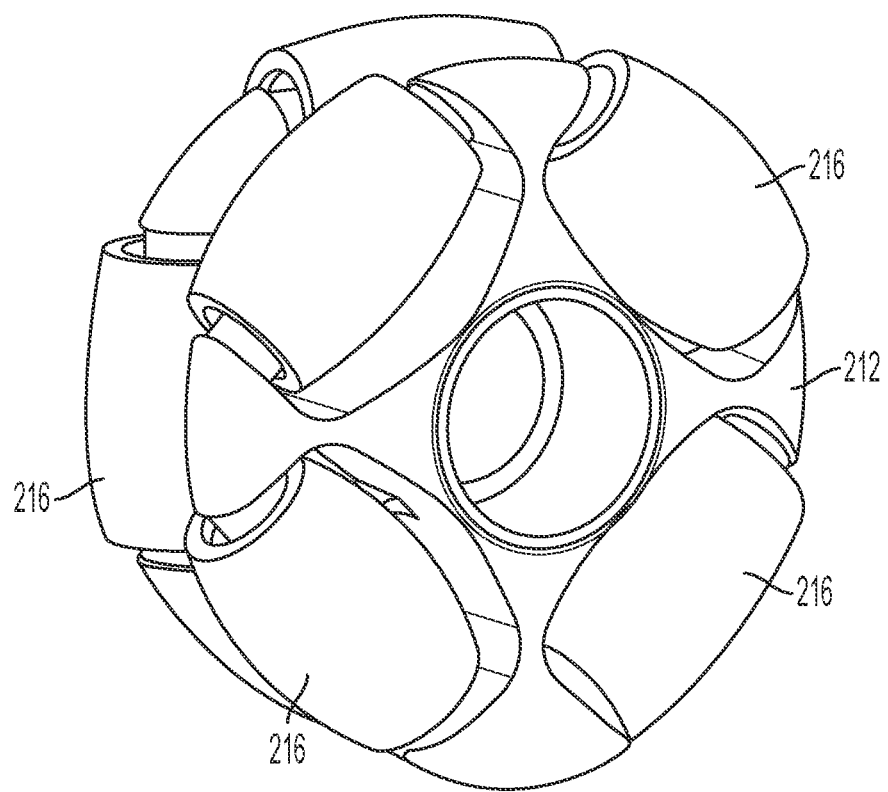
FIG. 18 is a perspective view of the multiple directional wheel of FIG. 4A.

It should be appreciated that a multi-directional roller may vary apart from what has been previously described herein. As noted above, FIG. 4A depicts a grooved roller 100b that includes a second portion 110b having a series of multi-directional wheels 212 (FIG. 18) that each include four secondary wheels 216 that are offset from secondary wheels 216 on an adjacent wheel 212. The offset between secondary wheels 216 on one wheel 212 relative to secondary wheels 216 on an adjacent wheel 212 is similar to the offset between secondary wheels 116 previously discussed, such that the entire or collective outer surface or circumference of a pair of adjacent wheels 212 will include at least one secondary wheel 116 in the longitudinal direction or the direction of the main axis. Secondary wheels 216 are not encased or otherwise covered by a frame or other structure. Similar to wheels 112 of FIGS. 1-3 and 5A, wheels 212 are coupled to one another in pairs which may provide increased strength and stability, and to ensure that the offset between secondary wheels 216 discussed above is maintained. In many aspects, wheels 212 may be similar or substantially identical in structure and function to multi-directional wheels and omni-wheels produced and marketed under the brand name ROTACASTER™, by Rotacaster Wheel Limited of Tighes Hills, Australia.

With further reference to FIGS. 4B-4E and 5B, another multi-directional roller 200 is shown that includes a single solid axle 218 and a single resilient member or spring 226. As shown, roller 200 further includes bearings 222, 224, a first portion 202 having a cylindrical body 204 with an outer surface 208, and a second portion 210 that is substantially similar or identical to second portion 110 previously discussed. In particular, second portion 210 includes the previously described wheels 112 having secondary wheels 116. In particular in the illustrated embodiment, roller 200 includes multiple sets of wheels 112 that are stacked side-by-side or adjacently with each other, with each wheel 112 including sixteen rollers or secondary wheels 116, with the sixteen rollers 116 of each wheel 112 comprising two adjacent sets of eight rollers 116 that are each circumferentially disposed about the center through hole of the wheel 112. As shown, the two adjacent sets of eight rollers 116 are offset with respect to each other. In the illustrated embodiment, roller 200 is shown to include four wheels 112. As noted above, internal bearing adaptor or sleeve 220 includes a small diameter portion 220a and a large diameter portion 220b, and is configured to couple the first and second portions to one another. A retaining ring or cap 318 coupled near or at an end of second portion 210 retains various components, such as sleeve 220 and/or axle 218, in a secured position via frictional engagement.

It should be appreciated that multi-directional wheels may be formed as rotatable frames or bodies that include one or more circular or annular-shaped "wheels" rotatable about a main axis, in which each frame or body is configured to support one or more sets of secondary wheels that rotate about an axis oriented at an angle to the main axis and that make up a second transport surface portion. The multi-directional wheels may also be formed of one unitary elongate and rotatable frame or main body that supports all of the secondary wheels of the second transport surface portion. It should also be appreciated that individual wheels, or wheels that are not coupled to an adjacent wheel, could also be used to support one or more secondary wheels within the scope of the present invention, and that a wheel may include more or less secondary wheels or rotatable elements apart from what has been described herein.

Thus, the roller and method of the present invention provide a multiple directional split roller for a transport conveyor. A portion of the transport surface of the roller includes multiple directional or omni-wheels, which permit articles to move substantially freely in a lateral direction across that portion of the roller without transferring lateral loads to the conveyor frame or to a drive belt driving the roller at the omni-wheels. Further, for skew roller beds, the multiple directional split roller reduces or substantially eliminates lateral forces on a belt driving the skew rollers at the omni-wheels.

Changes and modifications in the specifically described embodiments can be carried out without departing from the principles of the present invention, which is intended to be limited only by the scope of the appended claims, as interpreted according to the principles of patent law including the doctrine of equivalents.

The invention claimed is:

1. A roller for a conveyor system, said roller comprising:
a first portion comprising a cylindrical body configured to rotate about its longitudinal axis and having an exterior surface configured to support articles transported along the conveyor system in a transport direction;
a second portion coupled to said first portion and comprising a plurality of multi-directional wheels that are rotatable about respective main axes, and a plurality of secondary wheels disposed about an outer circumference of each of said multi-directional wheels and rotatable about respective secondary axes that are angled relative to the main axes;
a central shaft configured to support said roller at a frame of the conveyor system and to support said cylindrical body and said multi-directional wheels; and
an adapter bearing coupled to said central shaft and configured to support said multi-directional wheels;
wherein said adapter bearing engages with an end of said cylindrical body, and wherein said adaptor bearing is configured to transfer rotational motion of said multi-directional wheels to said cylindrical body.

2. The roller of claim 1, wherein said multi-directional wheels are disposed in linear arrangement alongside and parallel with said first portion such that the longitudinal axis of said first portion and the main axes of said multi-directional wheels are co-axial with one another.

3. The roller of claim 1, wherein said cylindrical body rotates synchronously with said multi-directional wheels.

4. The roller of claim 1, wherein the secondary axes are oriented perpendicular to the main axes.

5. The roller of claim 1, wherein an outer circumference of said cylindrical body and an outer circumference of said multi-directional wheels are substantially equal.

6. The roller of claim 1, wherein an article support surface of said multi-directional wheels is proud of an article support surface of said cylindrical body.

7. The roller of claim 1, wherein said roller is oriented at an oblique angle relative to the transport direction.

8. A roller conveyor for conveying articles in a transport direction, said roller conveyor comprising:
a conveyor frame;
a plurality of spaced-apart conveyor rollers coupled to said conveyor frame and comprising:
a first portion comprising a cylindrical body, said cylindrical body configured to rotate about its longitudinal axis and having an exterior surface configured to support articles transported along said roller conveyor;
a second portion coupled to said first portion and comprising a plurality of multi-directional wheels rotatable about a main axis, and a plurality of secondary wheels operably coupled at an outer circumference of said multi-directional wheels and rotatable about secondary axes that are perpendicular to the main axis; and
a drive belt configured to engage said second portion to drive said conveyor rollers.

9. The roller conveyor of claim 8, wherein said conveyor rollers are oriented perpendicular to the transport direction.

10. The roller conveyor of claim 8, wherein said cylindrical body defines a first article support surface, and wherein said multi-directional wheels define a second article support surface that is proud of said first article support surface.

11. The roller of claim 8, wherein said cylindrical body defines a first article support surface, wherein said multi-directional wheels define a second article support surface that is substantially coplanar with said first article support surface.

12. The roller conveyer of claim 8, wherein said roller conveyor is configured to receive articles from a right angle transfer of an adjacent conveyor system.

13. The roller conveyor of claim 8, wherein said conveyor rollers are oriented at an oblique angle relative to said drive belt.

14. The roller conveyor of claim 13, wherein said drive belt frictionally engages said secondary wheels to thereby rotate said secondary wheels, said multi-directional wheels, and said cylindrical body.

15. A method for driving rollers on a roller conveyor, said method comprising:
providing a plurality of multi-directional rollers for supporting articles transported along the conveyor, each multi-directional roller having:
a first portion comprising a cylindrical body configured to rotate about its longitudinal axis and having a first transport surface portion configured to support portions of articles transported along the conveyor; and
a second portion comprising a plurality of multi-directional wheels coupled with the first portion and defining a second transport surface portion, each of the plurality of multi-directional wheels having a main axis about which the multi-directional wheel is rotatable and a plurality of secondary wheels disposed about an outer circumference of a respective one of the multi-directional wheels and operable to rotate perpendicular to the multi-directional wheels, the plurality of secondary wheels defining an outer circumference of the second portion that is configured to support portions of articles transported along the conveyor;
providing a drive belt to drive the multi-directional rollers, wherein the drive belt is positioned to impart a frictional drive force onto ones of the plurality of secondary wheels;
driving the drive belt to drive the multi-directional rollers substantially in a conveyance direction of the conveyor; and
transporting an article on at least one chosen from the first transport surface portion and the second transport surface portion.

16. The method of claim 15, wherein the multi-directional rollers are oriented at an angle relative to the conveyance direction of the conveyor and the drive belt.

\* \* \* \* \*